(12) United States Patent
Korhonen et al.

(10) Patent No.: US 8,726,068 B2
(45) Date of Patent: May 13, 2014

(54) INTRA-REALM AAA FALLBACK MECHANISM

(75) Inventors: Jouni Korhonen, Riihimäki (FI); Hannes Tschofenig, Espoo (FI)

(73) Assignee: Nokia Seimens Networks Oy, Espoo (FI)

( * ) Notice: Subject to any disclaimer, the term of this patent is extended or adjusted under 35 U.S.C. 154(b) by 280 days.

(21) Appl. No.: 13/256,725

(22) PCT Filed: Apr. 21, 2009

(86) PCT No.: PCT/EP2009/054744
§ 371 (c)(1),
(2), (4) Date: Sep. 15, 2011

(87) PCT Pub. No.: WO2010/121649
PCT Pub. Date: Oct. 28, 2010

(65) Prior Publication Data
US 2012/0005523 A1    Jan. 5, 2012

(51) Int. Cl.
*G06F 11/00* (2006.01)

(52) U.S. Cl.
USPC ........................................ 714/4.11; 709/224

(58) Field of Classification Search
USPC .............................. 714/4.1, 4.11, 43; 709/224
See application file for complete search history.

(56) References Cited

U.S. PATENT DOCUMENTS

| 6,944,788 | B2 * | 9/2005 | Dinker et al. | 714/4.11 |
| 7,167,912 | B1 * | 1/2007 | Dhingra | 709/223 |
| 7,590,420 | B1 * | 9/2009 | Zaghloul et al. | 455/435.2 |
| 7,962,142 | B2 * | 6/2011 | O'Neill et al. | 455/439 |
| 8,140,888 | B1 * | 3/2012 | Dhingra et al. | 714/4.1 |
| 8,375,245 | B2 * | 2/2013 | Chang et al. | 714/4.11 |
| 2007/0256123 | A1 * | 11/2007 | Duane et al. | 726/6 |

FOREIGN PATENT DOCUMENTS

| EP | 1940112 | 7/2008 |
| WO | 2005/069189 | 7/2005 |

OTHER PUBLICATIONS

Sang Keun Yoo et al., "Enhancement of Failover Using Application Layer Watchdog and SCTP Heartbeat in Diameter," Mobile Communications. 7th CDMA International Conference, CIC 2002. Lecture notes in computer science, vol. 2524. Berlin, Germany, 2003, pp. 239-246, XP002552470.

International Search Report and Written Opinion corresponding to International Application No. PCT/EP2009/054744 dated Nov. 9, 2009.

Network Working Group, RFC 4282, "The Network Access Identifier", B. Aboba et al, Standard Track; The Internet Society, Dec. 2005, pp. 1-16.

Diameter Maintenance and Extensions (DIME), Internet-Draft; "Diameter User-Name and Realm Based Request Routing Clarifications", draft-ietf-dime-nai-routing-01.txt, J. Korhonen et al, Feb. 5, 2009, pp. 1-10.

\* cited by examiner

*Primary Examiner* — Yolanda L Wilson
(74) *Attorney, Agent, or Firm* — Squire Sanders (US) LLP

(57) ABSTRACT

There is provided an intra-realm AAA (authentication, authorization and accounting) fallback mechanism, wherein the single global realm may be divided in one or more sub-realms. The thus presented mechanism exemplarily comprises detecting a failure of an authentication server serving at least one authentication client within a first sub-realm of a single-realm authentication system, and routing authentication messages of the at least one authentication client to a fallback authentication server within a second sub-realm of the single-realm authentication system, wherein routing may exemplarily comprise sub-realm based source routing.

12 Claims, 6 Drawing Sheets

INTRA-REALM AAA FALLBACK MECHANISM

TECHNICAL FIELD

The present invention generally relates to an intra-realm AAA (authentication, authorization and accounting) fallback mechanism. Specifically, the present invention relates to a fallback mechanism in case of a server failure within a single-realm AAA infrastructure.

BACKGROUND ART

In modern and future communication networks including fixed and mobile telecommunication networks (such as for example Internet Protocol-based networks, Global System for Mobile Communication (GSM), General Packet Radio Service (GPRS), Universal Mobile Telecommunication System (UMTS), Long-Term Evolution (LTE) or the like) security and trustworthiness issues play an increasingly important role. Therefore, AAA (authentication, authorization and accounting) infrastructure is being usually deployed in or on top of such communication networks.

According to current techniques in the AAA field, such AAA infrastructure is organized and managed based on so-called realms (sometimes also referred to as domains) representing administrative entities within an overall AAA system of a single operator or provider. One known approach resides in that an overall AAA system of a single operator or provider comprises a single realm. That is, the entire AAA infrastructure in such an overall AAA system is organized and managed in a single overall realm (i.e. domain).

An organization or management of AAA infrastructure within a single realm may, however, have drawbacks in view of server failures.

In a large realm (such as e.g. "company.com"), which is operated e.g. by a large mobile operator, there may be regional sites including one or more AAA servers serving one or more AAA clients residing in the topological or geographical area covered by the respective regional site. Such regional sites do not represent administrative entities, but may be regarded as autonomous in that they share the same "operator-global" subscription data which is completely or at least partly replicated in respective AAA servers (and related databases etc.) of the individual regional sites. Especially in a large network (i.e. a large realm), for example in a nation-wide or even continent-wide deployment (such as that of an American or Chinese operator) of AAA infrastructure, regional sites with AAA servers and AAA clients may be topologically and geographically far away from each other. In case of a server failure in a regional site, the clients are to be delegated to a remote regional site as a backup operation.

While there are known certain fallback mechanisms in the context of AAA infrastructure failures, such as e.g. Diameter fallback mechanisms when Diameter is used as an AAA protocol, the known fallback mechanisms do not perform well or even do not work properly in a single-realm AAA system. That is, in case of a failure of an AAA server in a regional site within a single-realm AAA system, the known fallback mechanisms are not capable of ensuring an appropriate delegation of clients of the failed server to a backup server as well as an appropriate (i.e. instant and reliable) traffic handling in this regard. While this drawback exists in any single-realm AAA system, it is particularly adverse in large single-realm AAA systems (especially those in which regional sites are interconnected over an intra-operator network) because the known fallback mechanisms do not scale well and are error prone. In this regard, continent wide intra-operator networks could be mentioned as a non-limiting example for large single-realm AAA systems in question.

On the other hand, there are no standardized fallback mechanisms in other authentication environments, such as e.g. when RADIUS is used as an AAA protocol.

Accordingly, there does not exist any feasible solution for an intra-realm AAA fallback mechanism, in particular a fallback mechanism in case of a server failure within a (large) single-realm AAA infrastructure.

SUMMARY OF EXEMPLARY EMBODIMENTS OF THE INVENTION

The present invention and its embodiments are made to provide for a feasible solution for an intra-realm AAA fallback mechanism, in particular a fallback mechanism in case of a server failure within a (large) single-realm AAA infrastructure.

According to an exemplary first aspect of the present invention, there is provided a method comprising detecting a failure of an authentication server serving at least one authentication client within a first sub-realm of a single-realm authentication system, and routing authentication messages of the at least one authentication client to a fallback authentication server within a second sub-realm of the single-realm authentication system.

According to further developments or modifications thereof, one or more of the following applies:
- said routing comprises sub-realm based source routing,
- the method comprises reconfiguring authentication message routing information by indicating the second sub-realm with the fallback authentication server,
- the method comprises reconfiguring a user name by means of a network access identifier using a denomination of the second sub-realm and/or network access identifier decoration using a denomination of the second sub-realm and a denomination of the single overall realm of the authentication system,
- the first sub-realm with the failed authentication server is a local sub-realm, and the method comprises transmitting failure information of the failed authentication server to other sub-realms of the authentication system, selecting the second sub-realm with the fallback authentication server on the basis of failure information of authentication servers in other sub-realms of the authentication system, and sending a request for creating an authentication session to the selected second sub-realm,
- the first sub-realm with the failed authentication server is a remote sub-realm, and the method comprises receiving failure information of the failed authentication server from the first sub-realm, and receiving a request for creating an authentication session from the first sub-realm,
- the method comprises detecting an operation of the authentication server within the first sub-realm of the single-realm authentication system, and relaying and/or proxying and/or redirecting authentication messages of the at least one authentication client to the operating authentication server,
- said routing is effected over an intra-realm relay and/or proxy network interconnecting the first and second sub-realms of the authentication system,
- said routing is effected between back-to-back authentication agents of the first and second sub-realms of the authentication system,
- authentication is based on Diameter protocol, at least one of the authentication server and the fallback authentication server is an authentication, authorization and accounting server and/or a home subscriber system storing global subscription data of the authentication system, and/or said method is operable in an authentication, authorization and accounting agent.

According to an exemplary second aspect of the present invention, there is provided an apparatus comprising a detecting unit configured to detect a failure of an authentication server serving at least one authentication client within a first sub-realm of a single-realm authentication system, and a routing unit configured to route authentication messages of the at least one authentication client to a fallback authentication server within a second sub-realm of the single-realm authentication system.

According to further developments or modifications thereof, one or more of the following applies:

said routing unit is configured to execute sub-realm based source routing, the apparatus comprises a reconfiguring unit configured to reconfigure authentication message routing information by indicating the second sub-realm with the fallback authentication server, the apparatus comprises a reconfiguring unit configured to reconfigure a user name by means of a network access identifier using a denomination of the second sub-realm and/or network access identifier decoration using a denomination of the second sub-realm and a denomination of the single overall realm of the authentication system, the first sub-realm with the failed authentication server is a local sub-realm with respect to a location of the apparatus within the authentication system, and the apparatus comprises a transmitting unit configured to transmit failure information of the failed authentication server to other sub-realms of the authentication system, a selecting unit configured to select the second sub-realm with the fallback authentication server on the basis of failure information of authentication servers in other sub-realms of the authentication system, and a sending unit configured to send a request for creating an authentication session to the selected second sub-realm, the first sub-realm with the failed authentication server is a remote sub-realm with respect to a location of the apparatus within the authentication system, and the apparatus comprises a receiving unit configured to receive failure information of the failed authentication server from the first sub-realm, and a receiving unit configured to receive a request for creating an authentication session from the first sub-realm, the apparatus comprises a relaying and/or proxying and/or redirecting unit configured to relay and/or proxy and/or redirect authentication messages of the at least one authentication client to the operating authentication server, when the detecting unit detects an operation of the authentication server within the first sub-realm of the single-realm authentication system, said routing unit is configured to effect the routing over an intra-realm relay and/or proxy network interconnecting the first and second sub-realms of the authentication system, said routing unit is configured to effect the routing between back-to-back authentication agents of the first and second sub-realms of the authentication system, authentication is based on Diameter protocol, at least one of the authentication server and the fallback authentication server is an authentication, authorization and accounting server and/or a home subscriber system storing global subscription data of the authentication system, and/or said apparatus is operable as an authentication, authorization and accounting agent.

According to an exemplary third aspect of the present invention, there is provided a system comprising at least one sub-realm within a single-realm authentication system, each sub-realm comprising at least one apparatus according to the second aspect and/or anyone of the further developments or modifications thereof, at least one authentication client, and at least one authentication server serving the at least one authentication client.

According to an exemplary fourth aspect of the present invention, there is provided a computer program product comprising program code means being arranged, when run on a processor of an apparatus, to perform the method according to the first aspect and/or anyone of the further developments or modifications thereof.

According a further development or modification thereof, said apparatus is operable as an authentication, authorization and accounting agent By way of exemplary embodiments of the present invention, there is provided an intra-realm AAA fallback mechanism, in particular a fallback mechanism in case of a server failure within a (large) single-realm AAA infrastructure. The intra-realm AAA fallback mechanism according to embodiments of the present invention may exemplary be based on a splitting of a large realm into sub-realms in combination with a deployment of specific apparatuses for the thus resulting sub-realms, which may be referred to as back-2-back AAA agents. Such back-2-back AAA agents may be configured to act as relay agent and/or proxy agent and/or redirect agent in case of a proper operation of a local AAA server in the respective sub-realm, and to act as fallback server for respective AAA clients in case of a failure of a local AAA server in the respective sub-realm.

By way of exemplary embodiments of the present invention, a sub-realm based routing, such as e.g. a sub-realm based source routing, may be realized as an intra-realm AAA fallback mechanism. Hence, exemplary embodiments of the present invention may ensure an appropriate delegation of clients of the failed server to a backup server as well as an appropriate (i.e. instant and reliable) traffic handling in this regard. Accordingly, for example, an instant update of routing information for AAA message routing may be provided, while the occurrence of routing loops may be avoided.

By way of exemplary embodiments of the present invention, it may be beneficially achieved that:

existing AAA infrastructure (i.e. AAA clients, AAA servers, and intra-operator networks for interconnecting regional sites) do not need to be modified, because it is transparent for the splitting of the single overall realm into sub-realms, and only B2B agents are aware of the sub-realm concept, and/or recovery planning and maintenance as well as the addition of new sites/sub-realms of AAA infrastructure may be simplified, and/or redundancy of regional sites within a single-realm AAA system may be realized.

BRIEF DESCRIPTION OF THE DRAWINGS

In the following, the present invention will be described in greater detail by way of non-limiting examples with reference to the accompanying drawings, in which.

DETAILED DESCRIPTION OF EXEMPLARY EMBODIMENTS OF THE INVENTION

Figure 1:
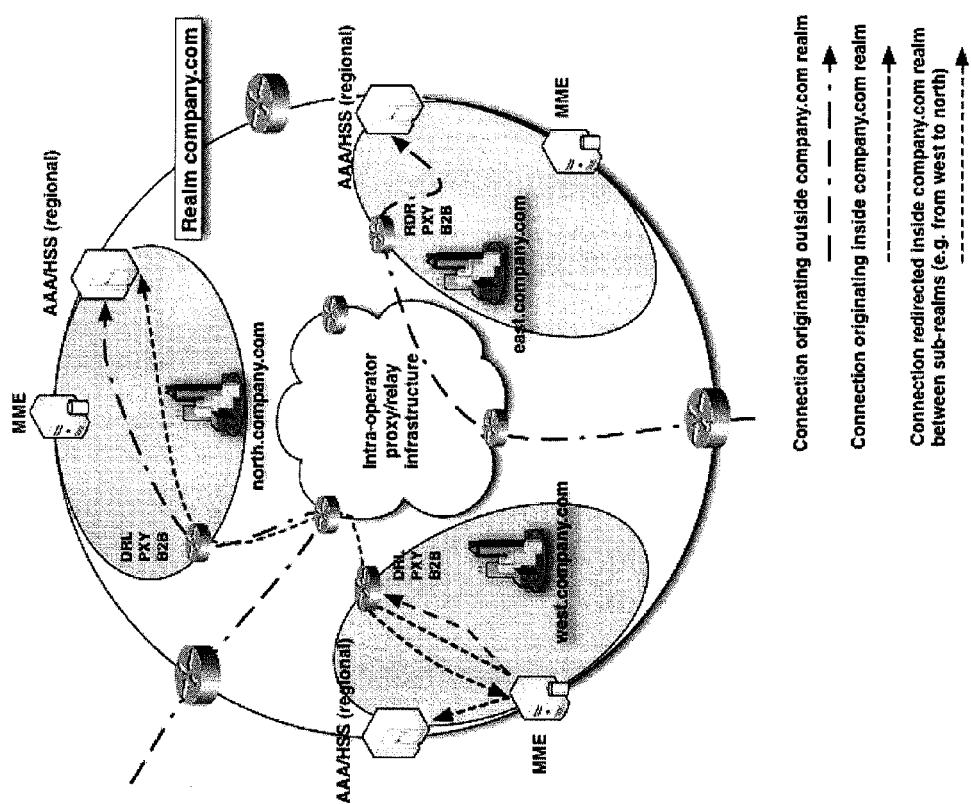
FIG. 1 shows a schematic diagram of an exemplary architecture of a single-realm AAA system illustrating three sub-realms in accordance with embodiments of the present invention.

The present invention is described herein with reference to particular non-limiting examples. A person skilled in the art will appreciate that the invention is not limited to these examples, and may be more broadly applied.

In particular, the present invention and its embodiments are mainly described in relation to 3GPP (Third Generation Partnership Project) specifications being used as non-limiting examples for certain exemplary network configurations. In particular, Diameter is used as a non-limiting example for an authentication protocol in this regard. Accordingly, a Diameter server/client/agent represents a non-limiting example of an authentication (or AAA) server/client/agent, while RADIUS may be used equally well as an authentication protocol. As such, the description of exemplary embodiments given herein specifically refers to terminology which is directly related thereto. Such terminology is only used in the context of the presented non-limiting examples, and does naturally not limit the invention in any way. Rather, any other system configuration or authentication protocol may also be utilized as long as compliant with the features described herein.

In the following, various embodiments and implementations of the present invention and its aspects or embodiments are described using several alternatives. It is generally to be noted that, according to certain needs and constraints, all of the described alternatives may be provided alone or in any conceivable combination (also including combinations of individual features of the various alternatives).

In general terms, exemplary embodiments of the present invention are based on splitting a large single realm of an AAA deployment into sub-realms in combination with an architectural approach of deploying and implementing so called back-2-back (B2B) AAA agents (e.g. B2B Diameter agents)) that are aware of regional site server states. The sub-realms may be incorporated in respective realm routing tables so as to enable a proper routing on the basis of the thus created architecture. An association/mapping between on overall (upper level) realm and its (lower level) sub-realms is typically a one-to-many relationship. The B2B agents may act as fallback servers in case of server failures. That is, depending on the situation in the regional site or sub-realm, the B2B agents may operate as a relay agent (e.g. a Diameter Relay Agent DRL) for intra regional site AAA (e.g. Diameter) traffic, or as a proxy agent (e.g. a Diameter Proxy Agent PXY) for traffic that enters or leaves the operator realm. In case of server failures, the B2B agents may act as fallback servers to clients in the regional site or sub-realm. In this regard, according to specific implementations, the B2B agents may create a new AAA (e.g. Diameter) session towards a remote fallback site or sub-realm. The AAA (e.g. Diameter) messages may then be routed over an intra-operator relay/proxy network e.g. using source routing, as all messages are still within the single overall operator realm, wherein sub-realms may be properly indicated for message routing. The AAA servers in the individual sites or sub-realm may be made transparent to source routing and inter-site routing, as the B2B agents may take care of source routing. According to specific implementations, the B2B agents may for example use Network Access Identifier (NAI) and/or Network Access Identifier (NAI) decoration technology.

In view thereof, exemplary embodiments of the present invention address intra-realm AAA (e.g. Diameter) routing issues within a large single-realm network which has regional "autonomous" sites sharing the same subscription data (the data is replicated on each site, i.e. in respective AAA servers and/or related databases etc.) in a case of server failures and subsequent fallbacks to alternative remote sites. Embodiments of the present invention thus exemplarily relate to 3GPP Diameter based AAA infrastructures and mobile operator AAA infrastructures in general. Embodiments of the present invention are applicable to any, in particular any large, Diameter (or RADIUS) deployment, while 3GPP Release-8 is one non-limiting example in this regard.

FIG. 1 shows a schematic diagram of an exemplary architecture of a single-realm AAA system illustrating three sub-realms in accordance with embodiments of the present invention. Generally, it is to be noted that the number of illustrated sites, servers, clients, and/or agents is only exemplarily, and any other number is equally conceivable.

In FIG. 1, the overall AAA system is deployed in a single overall realm denoted as "company.com", and this single overall realm is split into multiple sites or sub-realms, namely into "north.company.com", "east.company.com" and "west.company.com". In each of the thus illustrated sites or sub-realms, there is exemplarily illustrated one AAA server denoted as AAA/HSS (AAA: authentication, authorization and accounting, HSS: Home subscriber system) and one AAA client denoted as MME (MME: mobility management entity) being served by the AAA server in this site or sub-realm. Further, for each of the thus illustrated sites or sub-realms, there is deployed a network node denoted as DRL/PXY/B2B representing a back-2-back AAA agent according to embodiments of the present invention. The sites or sub-realms are interconnected over an intra-operator proxy/relay network, which is not mandatory for embodiments of the present invention being applicable.

It is to be noted that for entities connecting to the operator's infrastructure (e.g. roaming partners) and all regional sites the whole operator domain appears as "company.com" realm. That is, the splitting into sub-realms is only visible among the B2B agents according to embodiments of the present invention.

Further, by way of different arrows, it is illustrated how connections originating outside the realm, connections originating inside the realm, and connections being redirected inside the realm due to a server failure in the sub-realm "west.company.com" are routed. Details thereof are explained below.

Exemplary procedures according to embodiments of the present invention are explained below with reference to a non-limiting example on the basis of the architecture shown in FIG. 1 above.

Figure 2:
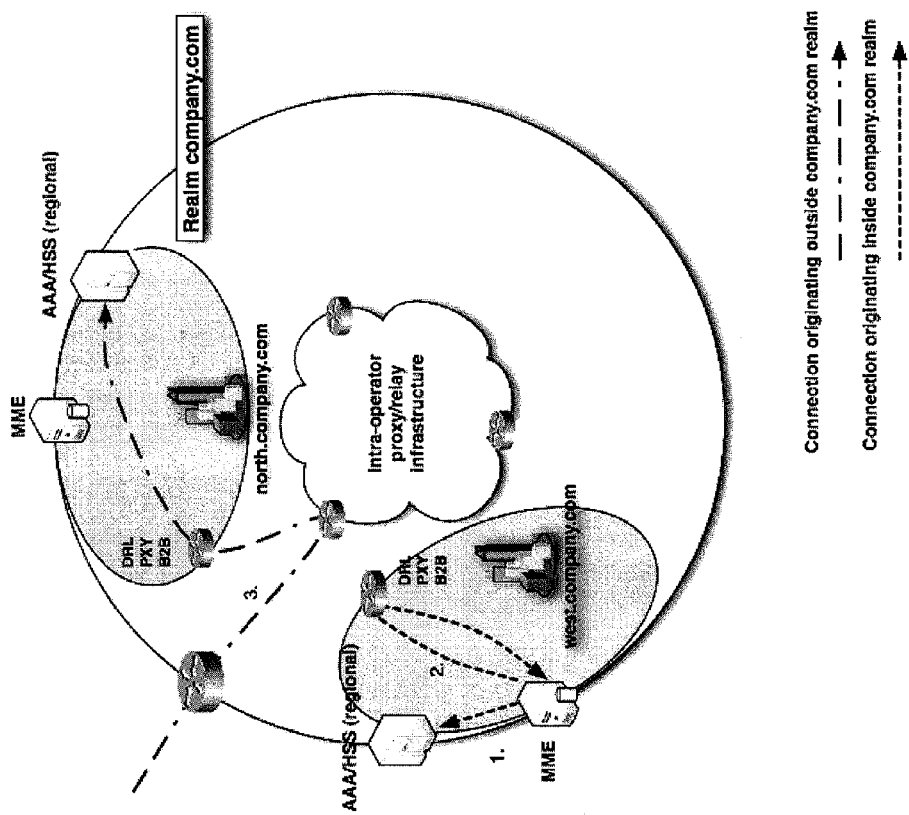
FIG. 2 shows a schematic diagram of an exemplary architecture of a single-realm AAA system illustrating two sub-realms in accordance with embodiments of the present invention, before a server failure.
Figure 3:
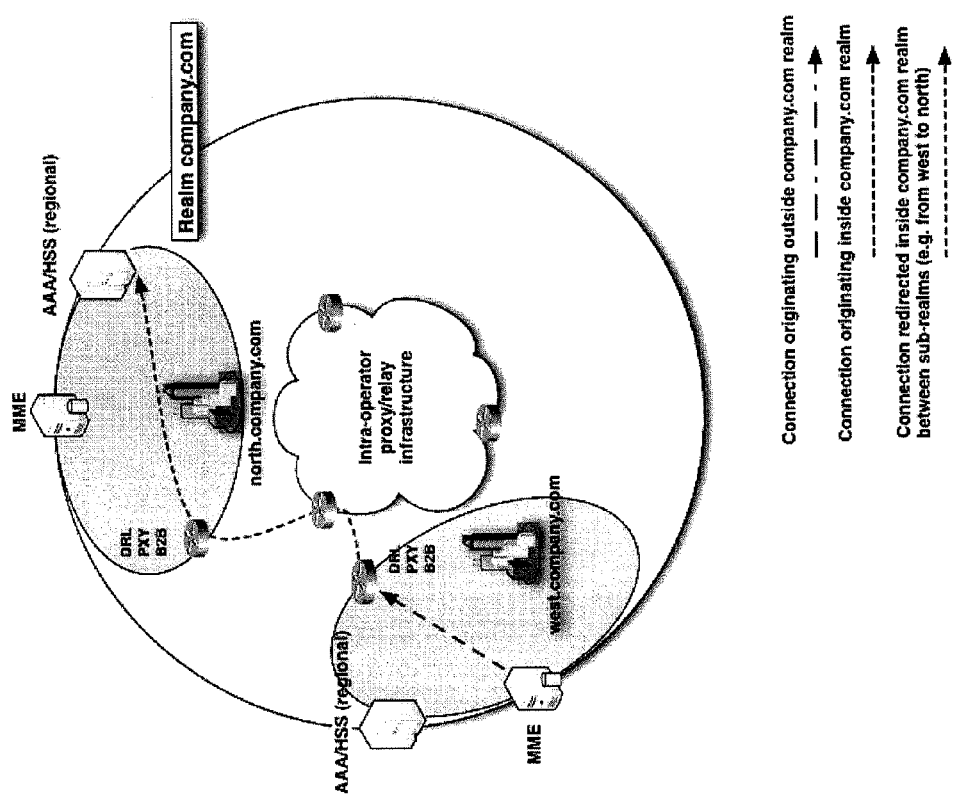
FIG. 3 shows a schematic diagram of an exemplary architecture of a single-realm AAA system illustrating two sub-realms in accordance with embodiments of the present invention, after a server failure.

FIG. 2 shows a schematic diagram of an exemplary architecture of a single-realm AAA system illustrating two sub-realms in accordance with embodiments of the present invention, before a server failure. FIG. 3 shows a schematic diagram of an exemplary architecture of a single-realm AAA system illustrating two sub-realms in accordance with embodiments of the present invention, after a server failure. It is to be noted that only two of the three sub-realms illustrated in FIG. 1 are illustrated in FIGS. 2 and 3, while the third sub-realm is omitted for the sake of clarity and intelligibility only.

Referring to FIG. 2, a MME node acting as a Diameter client uses standard Diameter routing techniques to route messages to the AAA/HSS node acting as Diameter server. FIG. 2 shows two possible variants, namely variant (1) indicates that the MME has a routing table entry pointing to the AAA/HSS, and variant (2) indicates a redirect approach, wherein the MME is allowed to learn about the AAA/HSS address to be learned via the DRL/PXY/B2B agent. In a third variant, not shown in the example of FIG. 2, a Diameter relay may be utilized, wherein all messages are routed via the DRL/PXY/B2B agent. A Network Access Identifier (NAI) used by the MME in this particular scenario is "company.com", even though three sub-realms exist.

Irrespective of the utilized Diameter routing approach, Diameter routing must be able to react to a failure of the AAA/HSS server. For example, in the redirect case this means that the MME may detect that the connection to the AAA/HSS is not functioning anymore, and then contacts the redirect agent (i.e. the DRL/PXY/B2B agent) again, which redirect agent then acts as a fallback server for the Diameter client MME. Similar procedures take place for the other two variants as well.

Referring to FIG. 3, it is assumed that the AAA/HSS the MME is in contact with fails, i.e. a failure of the Diameter server in the sub-realm "west.company.com" occurs.

When the MME contacts the B2B agent, the B2B agent detects the failure of the local Diameter server and handles a routing of Diameter messages to an alternative Diameter server in/of an alternative sub-realm. That is, the MME falls back to the DRL/PXY/B2B agent in its sub-realm as a new route towards the destination, and sends the Diameter requests to it.

In the illustrated example, the B2B agent of the sub-realm "west.company.com" with the failed Diameter server selects the sub-realm "north.company.com" as a backup sub-realm for the present local server failure. Hence, the relevant B2B agent may initiate a new connection or session towards the AAA/HSS server in the selected backup sub-realm "north.company.com" site. The B2B agent may form a request, and may utilize source routing using NAI and/or NAI decoration. When NAI decoration is used, the User-Name AVP (attribute-value-pair) may e.g. contain "company.com!username@north.company.com". The intra-operator routing network may then route the request to the DRL/PXY/B2B agent in the sub-realm "north.company.com", which may remove the decoration so that the User-Name AVP becomes to "username@company.com". The AAA/HSS server in the sub-realm "north.company.com" may then treat the incoming request as a regular message originating from its regional peers. Thus, the Diameter server in the alternative remote sub-realm replaces the failed Diameter server in the local sub-realm of the Diameter client in question.

Once the AAA/HSS in sub-realm "west.company.com" comes up, i.e. resumes a proper operation, the MME gets again redirected to it by the DRL/PXY/B2B agent, and regional signaling/routing is used again. Accordingly, the B2B agents are aware of AAA/HSS server conditions in each regional site or sub-realm. Such awareness may be achieved by any conceivable signaling procedure or, for example, by allowing the B2B agents to have peer connections (at authentication protocol, e.g. Diameter, level) with AAA/HSS servers in those regional sites. Thereby, the local B2B agents may recognize when a peer connection with servers in such a regional site goes down or up. Yet, such peer connections should preferably not be used for exchanging any authentication messages such as Diameter messages, which could for example be readily configured in their respective routing tables.

Figure 4:
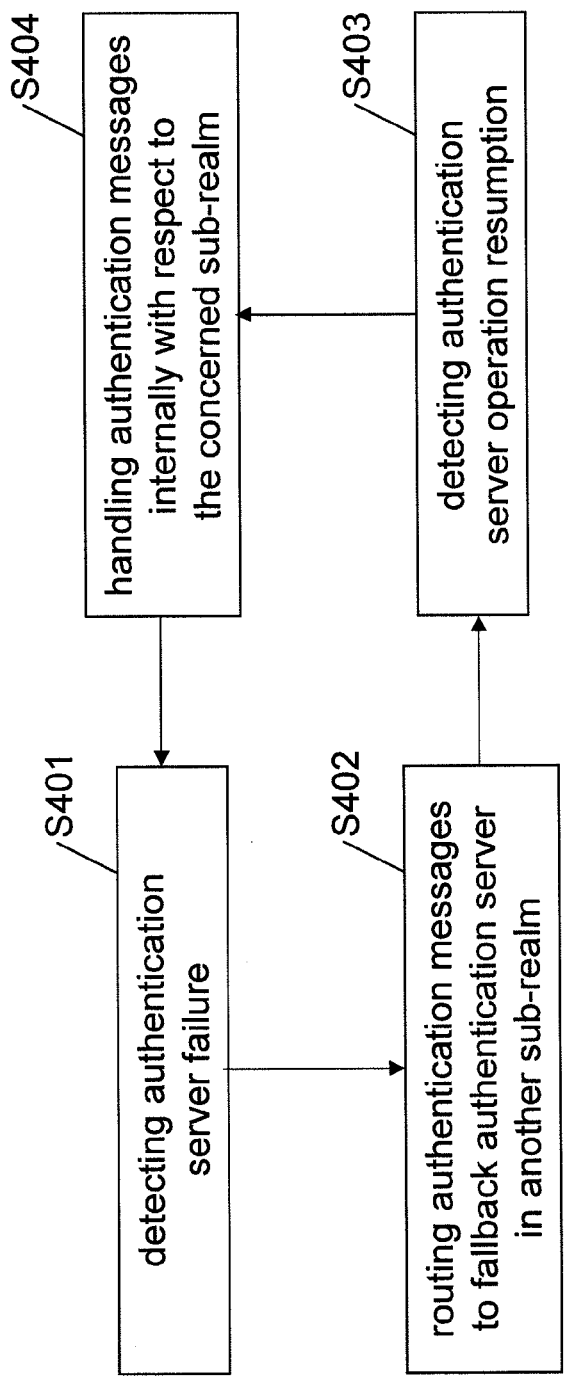
FIG. 4 shows a schematic flow diagram of an exemplary procedure according to embodiments of the present invention.

FIG. 4 shows a schematic flow diagram of an exemplary procedure according to embodiments of the present invention.

The procedure of FIG. 4 may be carried out by a B2B agent according to embodiments of the present invention, whether constituting a local B2B agent (i.e. a B2B agent of a sub-realm where a server failure occurs) or a remote B2B agent (i.e. a B2B agent of a sub-realm where a backup is realized).

Assuming that the Diameter server in question initially operates in a proper manner and then fails, the sever failure is detected in operation S401. Upon server failure detection, Diameter messages of a Diameter client having been served by the failed Diameter server are routed to a fallback Diameter server in a sub-realm other than the sub-realm where the failed server resides. That is, in operation S402, the B2B agent carrying out this procedure acts as fallback server. Upon detecting a resumption of a proper operation of the previously failed Diameter server in operation S403, Diameter messages of the Diameter client are again handled internally with respect to the respective sub-realm. That is, in operation S404, the B2B agent carrying out this procedure acts as proxy and/or relay and/or redirect agent (like prior to the above-mentioned serve failure).

Figure 5:
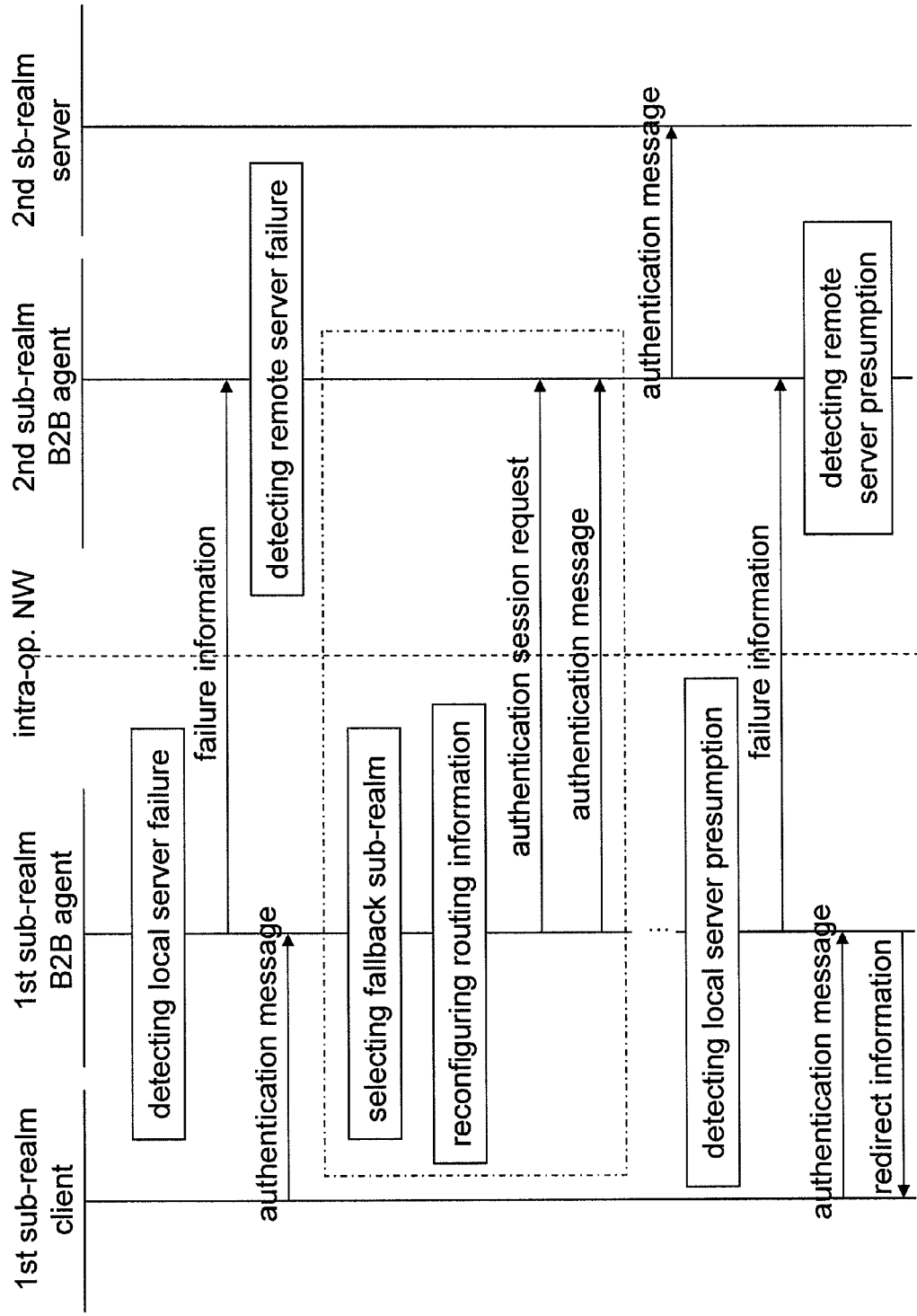
FIG. 5 shows a schematic signaling diagram of an exemplary procedure according to embodiments of the present invention.

FIG. 5 shows a schematic signaling diagram of an exemplary procedure according to embodiments of the present invention. This illustration shall exemplify an interaction between a local sub-realm or B2B agent (i.e. where a server failure occurs) and a remote sub-realm or B2B agent (where backup for server failure is realized). It is assumed that the first sub-realm is that where the AAA server fails, the second sub-realm is that where the AAA server acts as backup server, and that the first and second sub-realms are interconnected over an intra-operator network.

According to the exemplary procedure of FIG. 5, at first a local server failure is detected by the B2B agent of the first sub-realm. The local server failure may also be detected by the local client for example based on existing AAA protocol mechanisms (such as those built in Diameter protocol). Such a server failure detection may for example be accomplished by receiving a respective redirecting inquiry from a client in the first sub-realm, as indicated above. A server failure may also be detected by the client when its peer connection to the local server or the server stops responding to requests sent by the client. In this case, the client falls back to its "secondary server" which happens to be the B2B agent. Upon local server failure detection, the B2B agent of the first realm may send corresponding failure information to B2B agents of other sub-realms in the authentication system, in this case to the B2B agent of the second sub-realm. The reason for doing so is, for example, to inform other B2B agents not to use the failed server as their fallback remote server. Thus, the B2B agent of the second sub-realm is enabled to detect the server failure in the first sub-realm, i.e. a remote server failure.

When the B2B agent of the first sub-realm receives an authentication message from a client in the first sub-realm, it routes this authentication message to an alternative sub-realm for fallback purposes. Details of the exemplary routing procedure are illustrated in a box with dash-dotted line.

The B2B agent of the first sub-realm may firstly select an appropriate fallback sub-realm, in this case the second sub-realm, when more than one other sub-realms are present within the single overall realm. For example, such selection may be made per configuration, wherein the B2B agent may be (pre-)configured with one or more fallback sites. Such configuration may be made manually or using (external) support infrastructure such as e.g. DNS (Domain Name System/ Service) and/or LDAP (Lightweight Directory Access Protocol). Additionally or alternatively, such selection may be based on failure information from other sub-realms and the authentication servers thereof (which is not illustrated). According thereto, routing information for the routing of authentication messages (like the one illustrated to be received from a local client) may be reconfigured correspondingly. The routing information may be reconfigured by indicating the second sub-realm with the fallback authentication server. Alternatively or additionally, the routing information may be reconfigured by reconfiguring a user name (e.g. a User-Name AVP) by means of a network access identifier (NAI) using a denomination of the second sub-realm and/or network access identifier (NAI) decoration using a denomination of the second sub-realm and a denomination of the single overall realm of the authentication system.

By way of the thus reconfigured routing information, a request for creating an authentication session or connection with the second sub-realm may be sent to the B2B agent of the selected second sub-realm. Upon session or connection creating (not shown), authentication messages from clients of the first sub-realm may be properly routed (over the intra-operator network, if present) to the alternative sub-realm, and then further to the backup authentication server of the second sub-realm. The B2B agent of the second sub-realm may remove NAI decoration, if used, and may forward the thus received authentication messages to the authentication server of the second sub-realm for fallback purposes. The routing of authentication messages, as indicated in FIG. 5, may thus comprise sub-realm based source routing.

After the authentication server of the first sub-realm has resumed its operation (which may of course not be directly after completion of the above-described routing procedure, which is indicated by a break in the time line of the first sub-realm B2B agent), a proper operation of the local server is detected both locally and remotely (after corresponding (non-)failure information is transmitted to remote sub-realms). A local message handling at the first sub-realm may thus be resumed as well. Assuming the above-outlined redirect routing variant, the local client may be provided with respective redirect information upon receipt of an authentication message or a corresponding inquiry.

Although in FIG. 5 some failure information signaling between B2B agents is exemplarily illustrated, it is to be noted that such failure information signaling is not necessarily needed. According to exemplary embodiments of the present invention, respective procedures, entities and/or systems may also work without any explicit information exchange related to detected failures between B2B entities.

Hence, the failure information signaling illustrated in FIG. 5 is to be construed as an optional feature.

Although the foregoing embodiments of the present invention have been described mainly with reference to methods, procedures and functions, corresponding embodiments of the present invention also cover respective apparatuses, network nodes, including both software and/or hardware thereof.

Respective exemplary embodiments of the present invention are described below referring to FIG. 6, while for the sake of brevity reference is made to the detailed description of respective corresponding methods and operations according to FIGS. 4 and 5, respectively.

Figure 6:
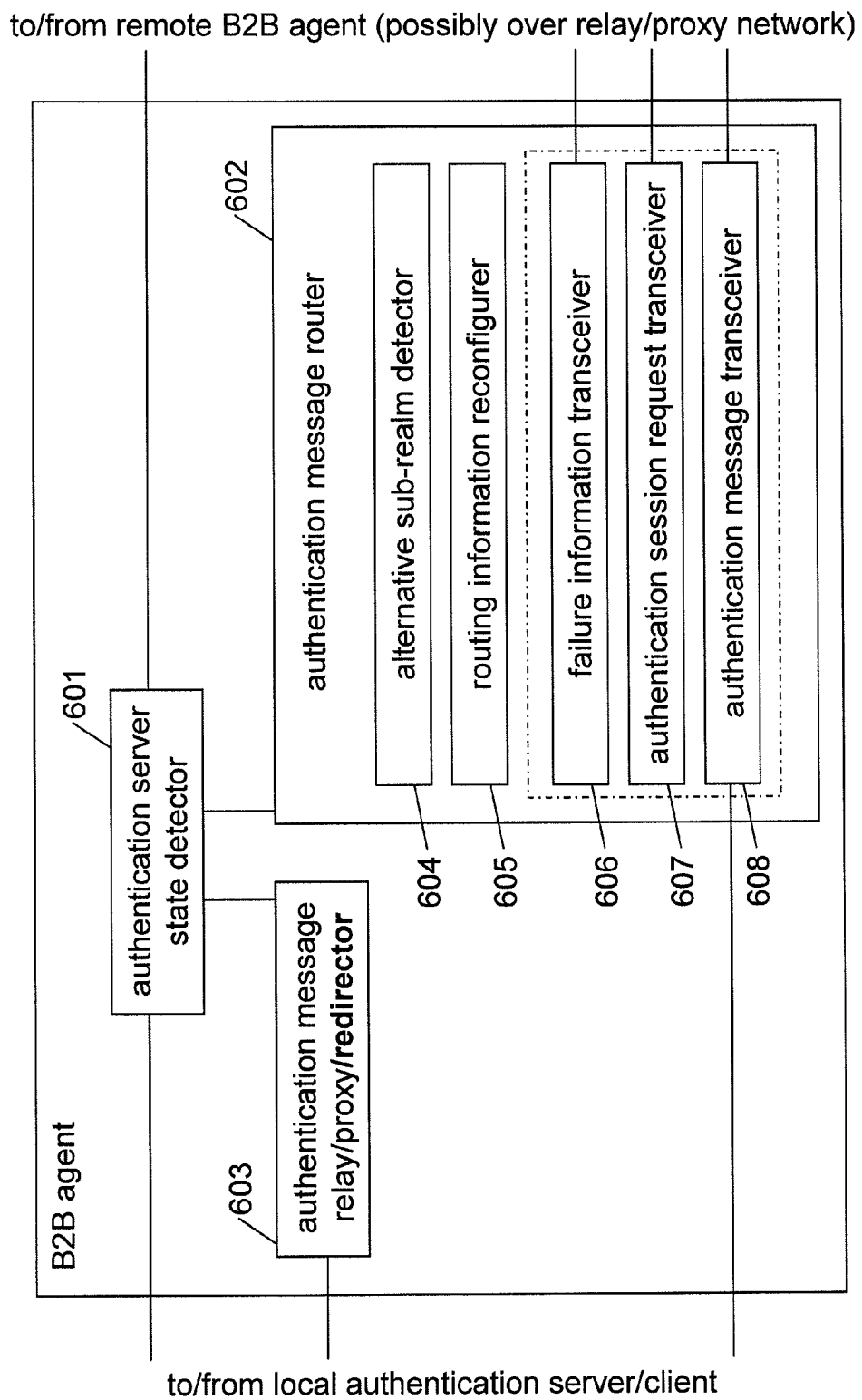
FIG. 6 shows a schematic block diagram of an exemplary apparatus according to embodiments of the present invention.

In FIG. 6 below, the solid line blocks are basically configured to perform the basic operations. The entirety of solid line blocks are basically configured to perform the methods and operations as described above, respectively. With respect to FIG. 6, it is to be noted that the individual blocks are meant to illustrate respective functional blocks implementing a respective function, process or procedure, respectively. Such functional blocks are implementation-independent, i.e. may be implemented by means of any kind of hardware or software, respectively. The lines interconnecting individual blocks are meant to illustrate an operational coupling there-between, which on the one hand is implementation-independent (e.g. wired or wireless) and on the other hand may also comprise an arbitrary number of intermediary functional entities not shown.

Further, in FIG. 6, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like.

FIG. 6 shows a schematic block diagram of an exemplary apparatus according to embodiments of the present invention. The thus depicted apparatus may for example be implemented as or in a B2B agent, as depicted in FIGS. 1 to 5 above.

The thus depicted apparatus is assumed to be connected to a local AAA client and/or a local AAA server of the same sub-realm, and to at least one remote B2B agent of at least one other sub-realm.

According to the exemplary embodiment depicted in FIG. 6, the thus depicted apparatus comprises an authentication server state detector, an authentication message router, and an authentication message relay/proxy/redirector. According to an exemplary implementation as depicted in FIG. 6, the authentication message router may comprise one or more of an alternative sub-realm selector, a routing information reconfigurer, a failure information transceiver, an authentication session request transceiver, and an authentication message transceiver.

It is to be noted that the alternative sub-realm selector, the routing information reconfigurer, the failure information transceiver, the authentication session request transceiver, and the authentication message transceiver are illustrated as logical components of the authentication message router. Yet, this logical illustration does not limit the implementation, wherein all of these units may be implemented independently from each other. The same applies to the illustrative logical aggregation of the three transceiver units, which does not exclude that all of these units are implemented independently or commonly in any conceivable combination. Stated in general terms, the authentication server state detector 601 represents means (e.g. a processor) for detecting a failure of an authentication server serving at least one (local or remote) authentication client within a sub-realm of a single-realm authentication system, and/or detecting an operation (resumption) of the authentication server within the sub-realm of the single-realm authentication system. To this end, the authentication server state detector 601 is connected with a local client and/or server and at least one remote B2B agent.

The authentication message router 602 represents means (e.g. a processor) for routing authentication messages of the at least one authentication client being served by a failed authentication server to a fallback authentication server within another sub-realm of the single-realm authentication system, when the authentication server state detector 601 detects a sever failure. The authentication message router 602 may be configured to execute sub-realm based source routing. To this end, the authentication message router 602 may comprise one or more of: the alternative sub-realm selector 604 representing means (e.g. a processor) for selecting the other sub-realm with the fallback authentication server on the basis of failure information of authentication servers in other sub-realms of the authentication system; the routing information reconfigurer 605 representing means (e.g. a processor) for reconfiguring authentication message routing information by indicating the other sub-realm with the fallback authentication server, and/or reconfiguring a user name by means of a network access identifier using a denomination of the second sub-realm and/or network access identifier decoration using a denomination of the second sub-realm and a denomination of the single overall realm of the authentication system; the failure information transceiver 606 representing means (e.g. a sender/receiver) for a transmitting and/or receiving failure information of the failed authentication server to other sub-realms of the authentication system; the authentication session request transceiver 607 representing means (e.g. a sender/receiver) for transmitting and/or receiving a request for creating an authentication session to the selected second sub-realm; and the authentication message transceiver 608 representing means (e.g. a sender/receiver) for transmitting and/or receiving authentication messages from a client having been served by the failed authentication server to a fallback authentication server. To this end, the transceiver units are connected with external apparatuses/nodes as depicted in FIG. 6.

The authentication message relay/proxy/redirector 603 represents means (e.g. a processor and/or sender/receiver) for handling authentication messages internally with the sub-realm in question, i.e. handling traffic as a local relay, proxy, and/or redirector, when the authentication server state detector 601 detects a sever operation (resumption). To this end, the relay/proxy/redirector is connected with a local client and/or server.

An apparatus as outlined above represents an autonomous entity according to respective embodiments of the present invention, while more of those apparatuses may interwork with each other, as indicated in FIGS. 1 to 3 and 5 above. Accordingly, embodiments of the present invention cover a system comprising at least one sub-realm within a single-realm authentication system, each sub-realm comprising at least one such apparatus, at least one authentication client, and at least one authentication server serving the at least one authentication client.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to those skilled in the art.

Software in the sense of the present description comprises software code as such comprising code means for performing the respective functions, as well as software (or a computer program or a computer program product) embodied on a tangible medium such as a computer-readable storage medium having stored thereon a respective data structure or code portions or embodied in a signal or in a chip, potentially during processing thereof.

Generally, for the purpose of the present invention as described herein above, it should be noted that method steps and functions likely to be implemented as software code portions and being run using a processor at one of the entities, a network element, or a terminal (as examples of devices, apparatuses and/or modules thereof, or as examples of entities including apparatuses and/or modules therefor), are software code independent and can be specified using any known or future developed programming language, such as e.g. Java, C++, C, and Assembler, as long as the functionality defined by the method steps is preserved;

generally, any method step is suitable to be implemented as software or by hardware without changing the idea of the invention in terms of the functionality implemented;

method steps, functions, and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The present invention also covers any conceivable combination of method steps and operations described above, and any conceivable combination of nodes, apparatuses, modules or elements described above, as long as the above-described concepts of methodology and structural arrangement are applicable.

There is provided an intra-realm AAA (authentication, authorization and accounting) fallback mechanism, wherein the single global realm may be divided in one or more sub-realms. The thus presented mechanism exemplarily comprises detecting a failure of an authentication server serving at least one authentication client within a first sub-realm of a single-realm authentication system, and routing authentication messages of the at least one authentication client to a fallback authentication server within a second sub-realm of the single-realm authentication system, wherein routing may exemplarily comprise sub-realm based source routing.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

The invention claimed is:

1. A method comprising:
   detecting a failure of an authentication server serving at least one authentication client within a first sub-realm of a single-realm authentication system; and
   routing authentication messages of the at least one authentication client to a fallback authentication server within a second sub-realm of the single-realm authentication system.

2. The method according to claim 1, said routing comprising sub-realm based source routing.

3. The method according to claim 2, further comprising:
   reconfiguring authentication message routing information by indicating the second sub-realm with the fallback authentication server.

4. The method according to claim 2, further comprising:
   reconfiguring a user name by means of a network access identifier using a denomination of the second sub-realm and/or network access identifier decoration using a denomination of the second sub-realm and a denomination of the single overall realm of the authentication system.

5. The method according to claim 1, wherein the first sub-realm with the failed authentication server is a local sub-realm, comprising:
   transmitting failure information of the failed authentication server to other sub-realms of the authentication system,
   selecting the second sub-realm with the fallback authentication server on the basis of failure information of authentication servers in other sub-realms of the authentication system, and
   sending a request for creating an authentication session to the selected second sub-realm.

6. The method according to claim 1, wherein the first sub-realm with the failed authentication server is a remote sub-realm, comprising:
   receiving failure information of the failed authentication server from the first sub-realm, and
   receiving a request for creating an authentication session from the first sub-realm.

7. The method according to claim 1, further comprising:
   detecting an operation of the authentication server within the first sub-realm of the single-realm authentication system; and
   relaying and/or proxying and/or redirecting authentication messages of the at least one authentication client to the operating authentication server.

8. The method according to claim 1, said routing being effected over an intra-realm relay and/or proxy network interconnecting the first and second sub-realms of the authentication system.

9. The method according to claim 1, said routing being effected between back-to-back authentication agents of the first and second sub-realms of the authentication system.

10. The method according to claim 1, wherein
    authentication is based on Diameter protocol, and/or
    at least one of the authentication server and the fallback authentication server is an authentication, authorization and accounting server and/or a home subscriber system storing global subscription data of the authentication system, and/or
    said method is operable in an authentication, authorization and accounting agent.

11. A computer program product embodied on a non-transitory computer-readable medium, the computer program product configured to control a processor of an apparatus to perform the method according to claim 1.

12. The computer program product according to claim 11, said apparatus being operable as an authentication, authorization and accounting agent.

* * * * *